United States Patent
Lefevre et al.

(10) Patent No.: US 11,203,345 B2
(45) Date of Patent: Dec. 21, 2021

(54) METHOD FOR PROTECTING A DUAL MASS FLYWHEEL, BY DETECTING THAT IT IS ENTERING INTO RESONANCE WHEN THE ENGINE IS RUNNING

(71) Applicants: Continental Automotive France, Toulouse (FR); Continental Automotive GmbH, Hannover (DE)

(72) Inventors: Julien Lefevre, Tournefeuille (FR); Benjamin Marconato, Villeneuve Tolosane (FR)

(73) Assignees: Continental Automotive France; Continental Automotive GmbH

( * ) Notice: Subject to any disclaimer, the term of this patent is extended or adjusted under 35 U.S.C. 154(b) by 125 days.

(21) Appl. No.: 16/489,135

(22) PCT Filed: Apr. 6, 2018

(86) PCT No.: PCT/FR2018/050866
§ 371 (c)(1),
(2) Date: Aug. 27, 2019

(87) PCT Pub. No.: WO2018/193179
PCT Pub. Date: Oct. 25, 2018

(65) Prior Publication Data
US 2019/0375413 A1 Dec. 12, 2019

(30) Foreign Application Priority Data
Apr. 18, 2017 (FR) .................................. 1753336

(51) Int. Cl.
*F02D 41/00* (2006.01)
*B60W 30/20* (2006.01)
(Continued)

(52) U.S. Cl.
CPC .......... *B60W 30/20* (2013.01); *F02D 41/0097* (2013.01); *F02D 41/021* (2013.01);
(Continued)

(58) Field of Classification Search
CPC ............. B60W 30/20; B60W 2030/206; F02D 41/0097; F02D 41/22
(Continued)

(56) References Cited

U.S. PATENT DOCUMENTS

| 5,747,678 A | 5/1998 | Angermaier | |
|---|---|---|---|
| 2010/0288035 A1* | 11/2010 | Arakawa | G01M 15/11 73/114.03 |

(Continued)

FOREIGN PATENT DOCUMENTS

| DE | 102004041205 A1 | 4/2005 |
|---|---|---|
| DE | 102008050287 A1 | 4/2009 |

(Continued)

OTHER PUBLICATIONS

International Search Report and Written Opinion for International Application No. PCT/FR2018/050866, dated May 22, 2018—8 pages.
(Continued)

*Primary Examiner* — Lindsay M Low
*Assistant Examiner* — Omar Morales
(74) *Attorney, Agent, or Firm* — RatnerPrestia

(57) ABSTRACT

A method for protecting a dual mass flywheel DMF, by detecting, when the engine in running, that the DMF is entering into resonance, the DMF being arranged between an internal combustion engine and a gearbox of a vehicle, comprising the following steps: • Determining the average rotational speed ($Vvil_{moy}$) of the crankshaft, over time, over a predetermined given period, as a first parameter constituting a risk of the DMF entering into resonance, • Measuring
(Continued)

the maximum instantaneous rotational speed and the minimum instantaneous rotational speed of the crankshaft, the difference defining the maximum amplitude ($Amp_{r_{vil}}$) of the rotational oscillations of the crankshaft, over the period, as a second parameter constituting a risk of the DMF entering into resonance, • Detecting when the DMF is entering into resonance from a determined combination of values of the first and second parameters, over the period, • limiting or cutting off the fuel injection in the cylinders after said detection.

5 Claims, 4 Drawing Sheets

(51) Int. Cl.
F02D 41/02 (2006.01)
F02D 41/22 (2006.01)
F02D 41/34 (2006.01)
F16F 15/14 (2006.01)

(52) U.S. Cl.
CPC ............ *F02D 41/22* (2013.01); *F02D 41/34* (2013.01); *F16F 15/1414* (2013.01); *B60W 2030/206* (2013.01); *B60W 2710/0616* (2013.01); *F02D 2200/101* (2013.01); *F02D 2250/28* (2013.01)

(58) Field of Classification Search
USPC .......................................................... 701/111
See application file for complete search history.

(56) References Cited

U.S. PATENT DOCUMENTS

| 2014/0309851 | A1* | 10/2014 | Felber | .................. F02N 11/106 |
| | | | | 701/33.9 |
| 2016/0153520 | A1 | 6/2016 | Yun et al. | |
| 2016/0215719 | A1* | 7/2016 | Nawrocik | ............... F02D 41/22 |

FOREIGN PATENT DOCUMENTS

| DE | 202013009182 U1 | 1/2015 |
| EP | 0711989 A1 | 5/1996 |
| EP | 2031223 A2 | 3/2009 |
| EP | 2230393 A2 | 9/2010 |
| EP | 2230393 A3 | 7/2011 |
| EP | 2230393 B1 | 8/2016 |
| KR | 20060072553 A | 6/2006 |
| WO | 2013053461 A1 | 4/2013 |

OTHER PUBLICATIONS

English Translation of the Written Opinion for International Application No. PCT/FR2018/050866, dated May 22, 2018, 5 pages.

* cited by examiner

METHOD FOR PROTECTING A DUAL MASS FLYWHEEL, BY DETECTING THAT IT IS ENTERING INTO RESONANCE WHEN THE ENGINE IS RUNNING

This application is the U.S. National Phase application of PCT International Application No. PCT/EP2018/050866, filed Apr. 6, 2018, which claims priority to French Patent Application No. 1753336, filed Apr. 18, 2017, the contents of such applications being incorporated by reference herein.

FIELD OF THE INVENTION

The present invention relates to a method and a device for protecting a dual mass flywheel by detecting, when the engine is running, that the dual mass flywheel is entering into resonance, this flywheel being positioned between an internal combustion engine and a gearbox of a vehicle.

BACKGROUND OF THE INVENTION

A dual mass flywheel (DMF) is a flywheel made up of two distinct parts, a first part attached to the engine and a second part attached to the gearbox of the vehicle via a transmission shaft. These two parts are free to rotate relative to one another and this degree of freedom to rotate is limited by springs positioned between these two parts. The springs make it possible to lessen the influences of the one on the other, more specifically jolts in the transmission or variations in combustion engine speed which are brought about by an engine torque that is derived from a plurality of cylinders. This dual mass flywheel design, because of the presence of the springs, introduces a resonant frequency which may lead to damped movements of one part with respect to the other which could go so far as to destroy components in extreme cases if no intervention is carried out.

The dual mass flywheel or DMF can therefore enter into resonance under certain engine and vehicle operating conditions. An experimental example gives the following results: the resonant frequencies, converted into engine speeds, are reached in the following scenarios:
  for an engine speed of 300 rpm when no gear ratio is engaged,
  for an engine speed of 400 rpm in first gear,
  for an engine speed of 800 rpm in 5th gear,
  for an engine speed of 1000 rpm in 6th gear.

The energy released by combustion therefore increases the amplitude of the resonance without raising the mean speed. It is therefore not possible to get out of resonance by accelerating.

Document US20160153520, incorporated herein by reference, teaches, for example, a method for protecting a dual mass flywheel (DMF) of a vehicle based on a comparison, by a controller, of a rotational speed of the engine of a vehicle against a threshold value which is set in such a way as to avoid the DMF having a point of resonance. If the rotational speed of the engine is below the threshold value, the injection of fuel into the engine is cut off by the controller in order to stop the engine. A condition for injecting fuel to restart the engine is determined after the fuel injection has been cut off, and the controller monitors whether this condition is satisfied. If the condition for injecting fuel is met, the injection of fuel into the engine is resumed by the controller in order to restart the engine.

According to document EP 2 230 393, incorporated herein by reference, a variation in the rotational speed of the crankshaft is compared against a determination of a variation in thresholds associated with driver behavior in order to eliminate the amplitude of resonance of a dual mass flywheel (DMF). The determination of the variation in thresholds associated with driver behavior is fixed on the basis of an operating state which reflects the intention of the driver of the vehicle to accelerate or decelerate and which is given, for example, by an action on the brake pedal. Thus, it is possible correctly to detect the start of resonance of the DMF with precision on the basis of the information regarding the intentions of the driver of the vehicle, including whether or not a braking operation is performed. It is thus possible to reduce or eliminate the variation in the power produced by the engine, at a suitable moment.

SUMMARY OF THE INVENTION

An aspect of the present invention proposes a method and a device for protecting a dual mass flywheel by improving the detection of the entry into resonance of a dual mass flywheel, and notably by improving the speed of detection.

One aspect of the present invention is therefore a tool to make it possible to limit, in terms of amplitude and in terms of duration, the time that a dual mass flywheel spends at resonance speed.

Another aspect of the present invention is a tool to make it possible to reduce the noise in the vehicle interior.

Another aspect of the present invention is a tool to make it possible to protect the transmission from the changes in speed of the crankshaft, which changes are caused by the combustions in the cylinders.

Another aspect of the present invention is a tool to make it possible to limit interference with learning in combustion-free deceleration phase by detecting conditions of entry into resonance of the DMF as early as possible.

More specifically, an aspect of the invention relates to a method for protecting a dual mass flywheel, or DMF, by detecting, when the engine is running, that the dual mass flywheel is entering into resonance, this flywheel being positioned between an internal combustion engine and a gearbox of a vehicle, characterized in that it comprises the following steps:
  determining the mean rotational speed of the crankshaft, over the course of time over a predetermined given period, as being a first parameter involved in a risk of the dual mass flywheel entering into resonance,
  measuring the maximum instantaneous rotational speed and the minimum instantaneous rotational speed of the crankshaft, using the difference to define the maximum amplitude of the fluctuations in the rotation of the crankshaft, over said predetermined given period, as being a second parameter involved in a risk of the dual mass flywheel entering into resonance,
  detecting that the dual mass flywheel has entered into resonance from a determined combination of values of said first and second parameters, over said predetermined given period,
  limiting or cutting off an injection of fuel into the cylinders after having detected that the dual mass flywheel has entered into resonance.

The protection method according to an aspect of the invention offers very rapid, effective and robust detection of the entry into resonance of the dual mass flywheel by monitoring, in a predetermined given period, a significant combination of engine parameters, taken from the mean rotational speed of the crankshaft and from the maximum amplitude of the fluctuations in the rotation of the crankshaft, therefore fluctuations in engine speed, evaluated concomitantly or near-concomitantly, namely in the same determined given time period. These parameters may be measured or determined using a sensor of known type that now exists on all internal combustion engines, which is the crankshaft position sensor, controlled by an engine control unit which performs the calculations. For example, a particularly suitable sensor is a toothed sensor notably comprising 60 teeth for one crankshaft revolution. Using such a position sensor, the engine control unit calculates the instantaneous rotational speed of the crankshaft tooth by tooth by differentiating the angular position, and from that produces a mean speed, over a predetermined given period. As a result, an aspect of the invention can easily be set in place at minimal cost by means of a simple software change implemented in the engine control unit (or ECU) with which all internal combustion engines are also equipped, and does not require any hardware in addition to that already present.

Once the entry into resonance has been detected according to an essential step of the method according to an aspect of the invention, and the diagnostics made as such, a number of consecutive solutions can be implemented under optimal conditions for preserving the dual mass flywheel and the transmission in general. For example, for a non-hybrid vehicle, one solution for stopping this phenomenon of resonance is to limit or cut off the injection of fuel, this being an operation that can be performed by the engine control unit using any known means. Cutting off the injection has the result of reducing the mean speed of the crankshaft and almost immediately stopping the fluctuations in engine speed as a result of the absence of combustion in the cylinders. In the case of a hybrid engine, one possible supplement to the method according to an aspect of the invention is to activate the electric motor to take over from the combustion engine. The injection is then still limited or cut off, and:

engine speed is maintained thanks to the electric motor, resonance is no longer present because it is stimulated by the combustions.

According to one advantageous feature, said determined combination of values of said first and second parameters, over said predetermined given period, is defined as follows:

said mean rotational speed of the crankshaft adopts:
  a value comprised between a predetermined maximum increase value and a predetermined maximum decrease value, distributed on each side of a stable mean speed value, and
  said stable mean speed value is below or equal to a predetermined threshold,
said maximum amplitude of the fluctuations in the rotation of the crankshaft adopts a value higher than or equal to a predetermined threshold.

The first parameter, which is the mean rotational speed of the crankshaft, is a critical parameter in the entry into resonance of the dual mass flywheel in that, on the one hand, this speed is stabilized or near-stabilized about a constant speed and, on the other hand, it is below or equal to a predetermined critical rotational-speed threshold, for example the low-idle speed. The second parameter is, jointly with the first, a critical parameter in the entry into resonance of the dual mass flywheel upwards of a predetermined maximum amplitude threshold which is dependent on parameters inherent to the DMF but also on engine and gearbox parameters. This threshold can be determined by calibration for each vehicle. Thus, if the mean rotational speed of the crankshaft is stable or substantially stable but too low, and if the maximum amplitude of the fluctuations of the crankshaft is too great, as will be described in greater detail further on with an exemplary embodiment of an aspect of the invention, the injection is limited or cut off, notably on a non-hybrid vehicle. Any other situation does not require specific intervention from the engine control unit because no resonance is detected. The method according to an aspect of the invention notably makes it possible to exclude the scenario of a conventional engine start, as will be explained later on in the description of exemplary embodiments of aspects of the invention.

According to one advantageous feature, said predetermined given period is comprised between 0.5 s and 2 s, preferably between 1 s and 2 s.

This period is a compromise between a period that is long enough to detect a significant change in the mean speed of the crankshaft, namely in this instance in its stability, and short enough to allow, for example, the engine control unit to take suitable measures for interrupting the resonance as quickly as possible from the moment it has been detected according to the method according to t an aspect of the invention.

An aspect of the invention also relates to a device for protecting a dual mass flywheel, or DMF, by detecting, when the engine is running, that the dual mass flywheel is entering into resonance, this flywheel being positioned between an internal combustion engine and a gearbox of a vehicle, characterized in that it comprises:

means for determining the mean rotational speed of the crankshaft, over the course of time over a predetermined given period, as being a first parameter involved in a risk of the dual mass flywheel entering into resonance, means for measuring the maximum instantaneous rotational speed and the minimum instantaneous rotational speed of the crankshaft, using the difference to define the maximum amplitude of the fluctuations in the rotation of the crankshaft, over said predetermined given period, as being a second parameter involved in a risk of the dual mass flywheel entering into resonance, means for detecting that the dual mass flywheel has entered into resonance from a determined combination of values of said first and second parameters, over said predetermined given period, means for limiting or cutting off an injection of fuel into the cylinders after having detected that the dual mass flywheel has entered into resonance.

According to an advantageous feature, said means for determining the mean rotational speed of the crankshaft, said means for measuring the maximum instantaneous rotational speed and the minimum instantaneous rotational speed of the crankshaft, using the difference to define the maximum amplitude of the fluctuations in the rotation of the crankshaft, and said means for detecting that the dual mass flywheel has entered into resonance from a determined combination of values of said first and second parameters, over said predetermined given period, said means for limiting or cutting off an injection of fuel into the cylinders after having detected that the dual mass flywheel has entered into resonance, comprise a crankshaft position detector made up of a plurality of teeth making it possible to determine the rotational speed of the crankshaft, tooth by tooth, and an engine control unit.

DETAILED DESCRIPTION OF THE PREFERRED EMBODIMENTS

Figure 1:
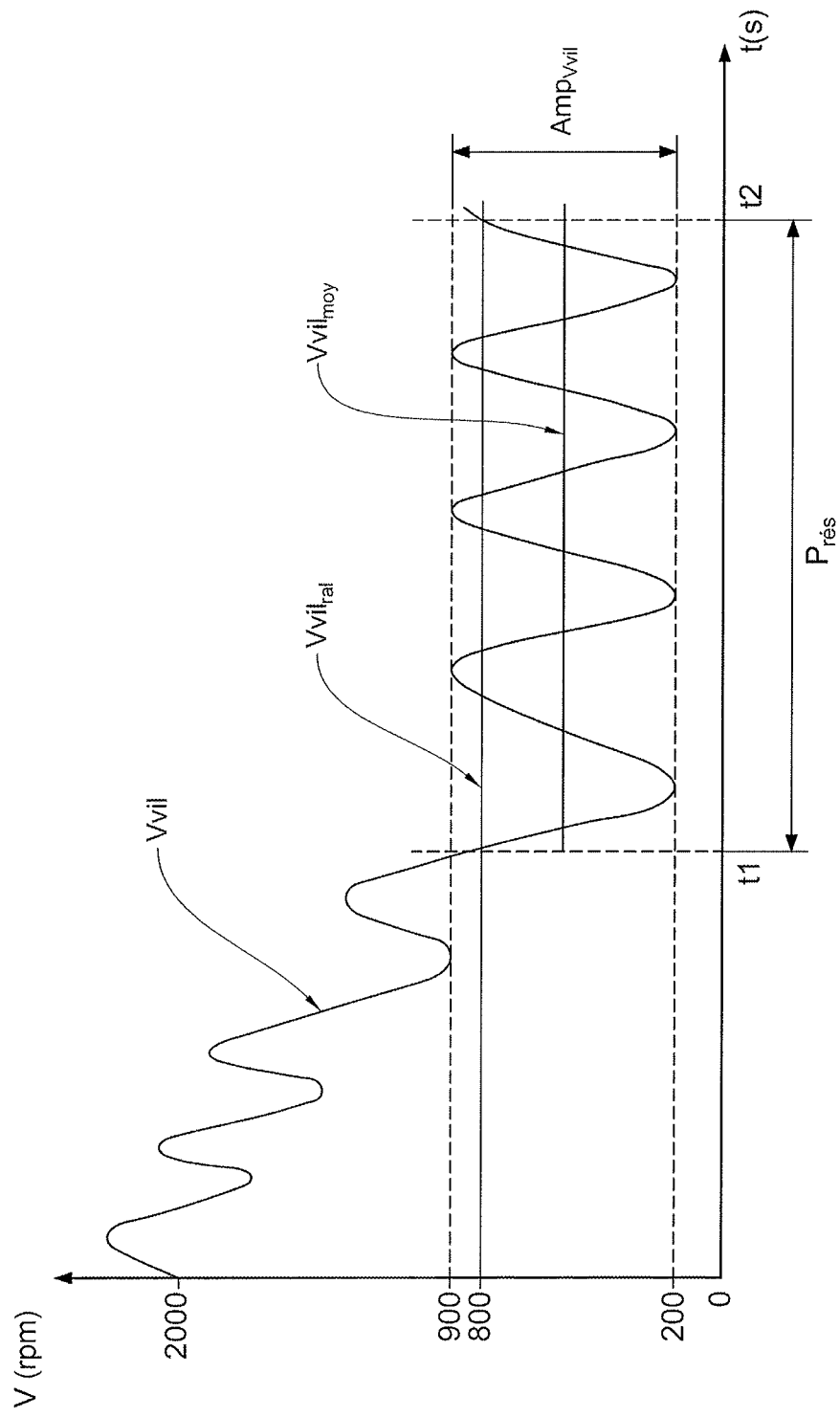
FIG. 1 is a diagram of an example of a curve of the rotational speed of the crankshaft according to one example of a method according to an aspect of the invention for protecting a dual mass crankshaft by detecting that it has gone into resonance while the engine is running.

The diagram in FIG. 1 shows the evolution of the curve of the crankshaft speed Vvil or engine speed of a vehicle, measured over the course of time, for example for a vehicle moving along under the action of a multi-cylinder combustion engine. The abscissa axis bears a scale of time t in seconds (s), and the ordinate axis bears a scale of engine speed V or crankshaft rotational speed in revolutions per minute (rpm). The low-idle speed has been indicated by a defined horizontal mark predetermined by the engine control unit (not depicted) at 800 rpm in this instance.

In the engine example given in FIG. 1, the crankshaft speed illustrated by the curve Vvil passes, over the course of time, over a period of around half a second corresponding to half the length of the abscissa axis depicted, from a speed of around 2000 rpm to a mean speed of the order of 500 to 600 rpm, representing, for example, a stalling phase, or a decrease in engine speed in an underspeed zone, the vehicle running at very low speed with a gear, for example fifth gear, engaged.

The curve Vvil of crankshaft speed is obtained by a crankshaft position toothed sensor comprising for example 60 teeth making it possible to calculate the instantaneous speed of the crankshaft tooth by tooth, in the known way, for example by measuring the angular displacement of the sensor between two signals given by the passing of two successive teeth past the sensor, and by measuring the time elapsed between these two signals. Thus, the speed curve shows fluctuations in engine speed over the course of time in a predetermined given period, illustrating accelerations in speed during combustions in the cylinders, and decelerations between combustions.

Simultaneously with measuring the instantaneous speed tooth by tooth using the sensor, the engine control unit calculates the mean rotational speed of the crankshaft, likewise in the known way, by averaging the instantaneous speed over a predetermined given period.

The curve Vvil illustrated in FIG. 1 therefore has a first phase of decrease in the mean rotational speed of the crankshaft, passing from a mean speed of around 2000 rpm to a mean speed of the order of 500 to 600 rpm, namely below the mean low-idle speed $Vvil_{ral}$ set at 800 rpm.

By studying the evolution in the rotational speed Vvil over the time period [0, t1] in FIG. 1, it is found that there is a fairly steeply decreasing mean speed with, at the same time, significant and increasing maximum amplitudes of fluctuation. According to an aspect of the invention, because the mean speed is steeply decreasing, there are no grounds for detecting that the DMF is entering into resonance, because the engine could be in a stopping phase. Over the period $P_{rés}$ which follows on from the instant t1 and is comprised between the instants t1 and t2 as depicted, having a duration of around 0.5 s, it is found that the mean speed calculated from the rotational speed Vvil of the crankshaft has stabilized or near-stabilized, in this example at a speed of the order of 500 to 600 rpm and that the maximum amplitude $Amp_{Vvil}$ of the fluctuations in engine speed is still high.

What is meant here by the mean rotational speed of the crankshaft being near-stabilized is a mean speed which may potentially vary within a permitted range of variation, which is small about a stabilized speed. For preference, the permitted range of variation in mean speed is of the order of 200 rpm, more preferably of the order of 100 rpm.

Thus, according to an aspect of the invention:

first of all, the mean rotational speed $Vvil_{moy}$ of the crankshaft has been determined over the course of time over a predetermined period $P_{rés}$, for example greater than 0.5 s in FIG. 1, comprised between t1 and t2, as being a first parameter involved in a risk of the dual mass flywheel entering into resonance, this mean speed $Vvil_{moy}$ advantageously adopting:

a value comprised between a predetermined maximum increase value and a predetermined maximum decrease value, distributed on either side of a stable mean speed value $Vvil_{moy}$, in this example a stabilized mean speed $Vvil_{moy}$ of the order of 600 rpm with a permissible range of variation about the stabilized speed for example of the order of 100 rpm, and said stable mean speed value being below or equal to a predetermined threshold $S_{Vvilmoyrés}$, in this example the threshold $S_{Vvilmoyrés}$ being fixed at the mean low-idle speed $Vvil_{ral}$ of 800 rpm, and the stabilized mean speed $Vvil_{moy}$ over the period comprised between t1 and t2 being of the order of 600 rpm, secondly, the instantaneous maximum rotational speed and the instantaneous minimum rotational speed of the crankshaft have been determined, the difference between these determining the maximum amplitude $Amp_{Vvil}$ of the fluctuations in rotation of the crankshaft over the same predetermined given period $P_{rés}$, namely the period of time comprised between t1 and t2, as being a second parameter involved in the risk of the dual mass flywheel entering into resonance; the maximum amplitude $Amp_{Vvil}$ of the fluctuations in the rotation of the crankshaft adopting, in this example, a value higher than or equal to a predetermined threshold $S_{AmopVvilrés}$, for example a maximum amplitude higher than or equal to 100 rpm, preferably higher than or equal to 200 rpm, from a determined combination of values of the first and second parameters, over this predetermined given period $P_{rés}$, it has thus been detected that the dual mass flywheel has entered into resonance.

According to FIG. 1, once the diagnosis that the DMF has entered into resonance has been made, injection can be limited or cut off in any known way using the engine control unit, in order to get out of this resonance situation, in the case of a non-hybrid vehicle.

One example of a method according to an aspect of the invention will now be described using the flow diagram of FIG. 2.

With a view to limiting the use of computation means and memory space in the engine control unit, activation of the method for detecting that the DMF has entered into resonance may advantageously be limited. For example, the method may be activated only when the engine is operating below a given mean rotational speed threshold $Seuil_{survVvil}$. This monitoring threshold $Seuil_{survVvil}$ is defined as being the speed above which there is no risk of DMF resonance. The threshold $Seuil_{survVvil}$ can be established by calibration for each vehicle or defined in general as a speed that is perhaps higher but more generic, for example a speed of the order of 2000 rpm.

In step 10 in FIG. 2, the engine control unit continuously calculates the mean rotational speed $Vvil_{moy}$ of the crankshaft and moves on to the next step 20 when this mean rotational speed $Vvil_{moy}$ of the crankshaft is below the threshold speed $Seuil_{survVvil}$ set, for example, at 2000 rpm.

Figure 2:
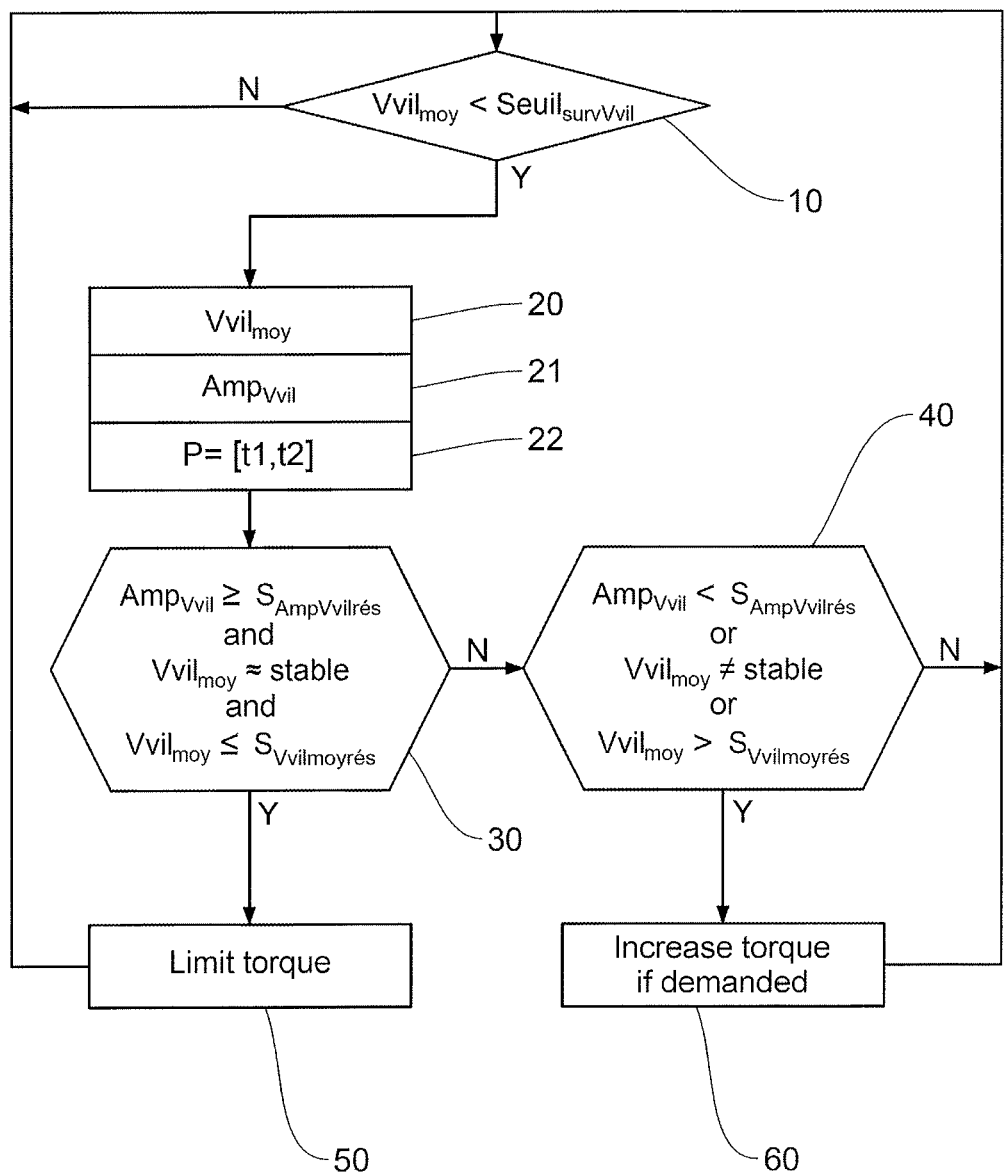
FIG. 2 is a flow diagram of an example of a method according to an aspect of the invention for protecting a dual mass crankshaft by detecting that it has gone into resonance while the engine is running.

In steps 20 and 21 in FIG. 2, the engine control unit continuously calculates the mean rotational speed $Vvil_{moy}$ of the crankshaft and the maximum amplitude $Amp_{Vvil}$ of the fluctuations in crankshaft rotation, respectively.

The critical stabilized mean speed $Vvil_{moy}$, namely below or equal to the speed threshold $S_{Vvilmoyrés}$, is dependent on the gearbox gear ratio engaged, and is therefore established by calibration for each gearbox ratio; if no gear is engaged, a critical stabilized mean speed value $Vvil_{moy}$ is for example of the order of 600 rpm, in a range of variation comprised between 100 and 200 rpm.

The engine control unit has in memory the current period P=[t1, t2], for example a period comprised between 0.5 and 2 seconds, preferably between 1 and 2 seconds of stability, which serves as a calculation basis for detecting that the DMF has gone into resonance, at the end of which period the control unit proceeds with continuously evaluating the combination of the first and second parameters, the mean rotational speed $Vvil_{moy}$ of the crankshaft and the maximum amplitude $Amp_{Vvil}$ of the fluctuations in crankshaft rotation, this reference to the monitoring period being indicated by step 22 in FIG. 2.

During step 30, over a current period P=[t1, t2], the engine control unit monitors the evolution in mean speed as indicated above in order to detect stability thereof, likewise as indicated above, and also compares the value of this mean rotational speed $Vvil_{moy}$ of the crankshaft against the speed threshold $S_{Vvilmoyrés}$, and compares the calculated maximum amplitude $Amp_{Vvil}$ of the fluctuations in crankshaft rotation against the predetermined threshold $S_{AmpVvilrés}$, these operations also being carried out in the memory of the ECU and:
  if the mean rotational speed $Vvil_{moy}$ of the crankshaft is stable or near-stable and also below or equal to the speed threshold $S_{Vvilmoyrés}$, and
  if the calculated maximum amplitude $Amp_{Vvil}$ of the fluctuations in the rotation of the crankshaft is above or equal to the predetermined threshold $S_{AmpVvilrés}$,
  then in step 50 in FIG. 2, the engine control unit limits or cuts off the injection of fuel to the cylinders; the method then returns to step 10 described above.

If the answer at step 30 is in the negative, the engine control unit proceeds to a step 40 as follows:
  if the mean rotational speed $Vvil_{moy}$ of the crankshaft is not stable or near-stable, or
  if the mean rotational speed $Vvil_{moy}$ of the crankshaft is above the speed threshold $S_{Vvilmoyrés}$, or
  if the calculated maximum amplitude $Amp_{Vvil}$ of the fluctuations in the rotation of the crankshaft is below the predetermined threshold $S_{AmpVvilrés}$,
  then during a step 60, the engine control unit proceeds to increase the torque up to the limit of the torque demanded by the driver; the method then returns to step 10 described above.

If the answer at step 40 is in the negative, the method then returns to step 10 described above.

Figure 3:
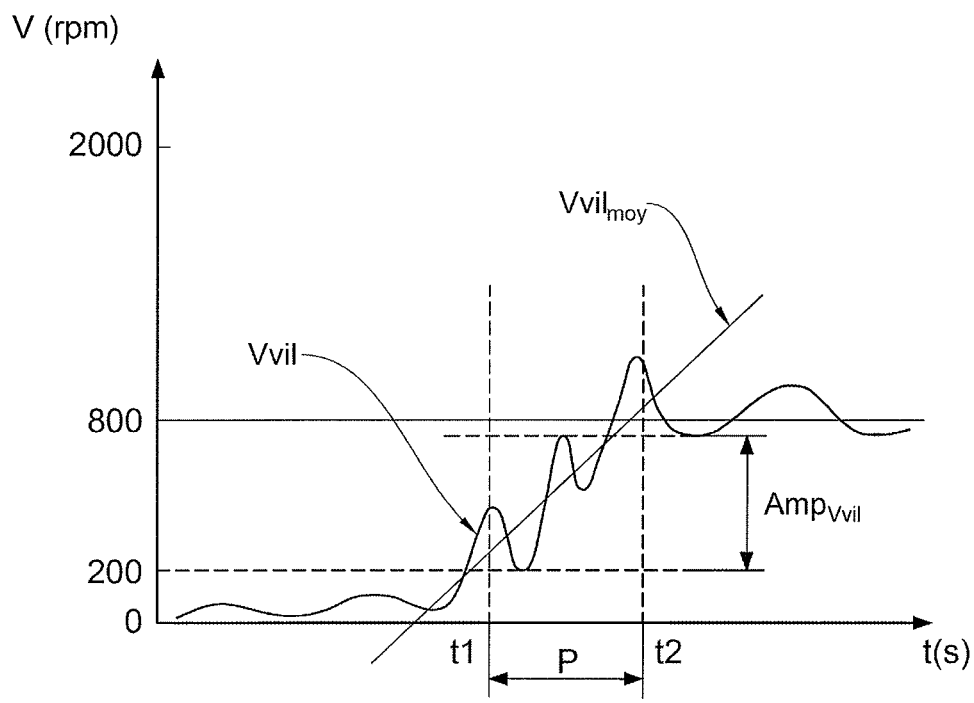
FIG. 3 is a diagram of one example of a curve of the rotational speed of the crankshaft during an engine start.

FIG. 3, which shows an example of how the rotational speed of the crankshaft evolves during an engine start, must not lead to a diagnosis that the DMF has entered into resonance, according to the method described in FIG. 2, as explained hereinafter.

The abscissa and ordinate axes in this FIG. 3 are identical to those of FIG. 1 and the same references as those used in FIG. 1 indicate similar means.

In the period P=[t1, t2] the engine control unit logs a steep increase in the mean rotational speed $Vvil_{moy}$ of the crankshaft, followed, after the instant t2, by this mean speed stabilizing around a speed of 800 rpm, representing the engine low-idle speed, with an attenuation in the fluctuations in the rotation of the crankshaft. During the steep increase in the mean rotational speed $Vvil_{moy}$ of the crankshaft in the period P, the maximum amplitude $Amp_{Vvil}$ of the fluctuations in the rotation of the crankshaft is high and for example exceeds the threshold $S_{AmpVvilrés}$ used in the engine control unit. Nevertheless, the second parameter which consists of the evolution in mean speed $Vvil_{moy}$ over the period P does not demonstrate any stability. As a result, step 30 according to the flow diagram of FIG. 2 is not satisfied, and the method in this case passes on to step 40, which is a step that is the reverse of step 30.

In the example of FIG. 3, step 40 is satisfied because, over the period P considered, despite a maximum amplitude $Amp_{Vvil}$ above the threshold $S_{AmpVvilrés}$, the mean speed $Vvil_{moy}$ over the period P is not stable, this second parameter being alternative of the first in step 40. The method thus in this case passes on to step 60, which consists in increasing the engine torque within the limit of the torque demanded by the driver.

Figure 4:
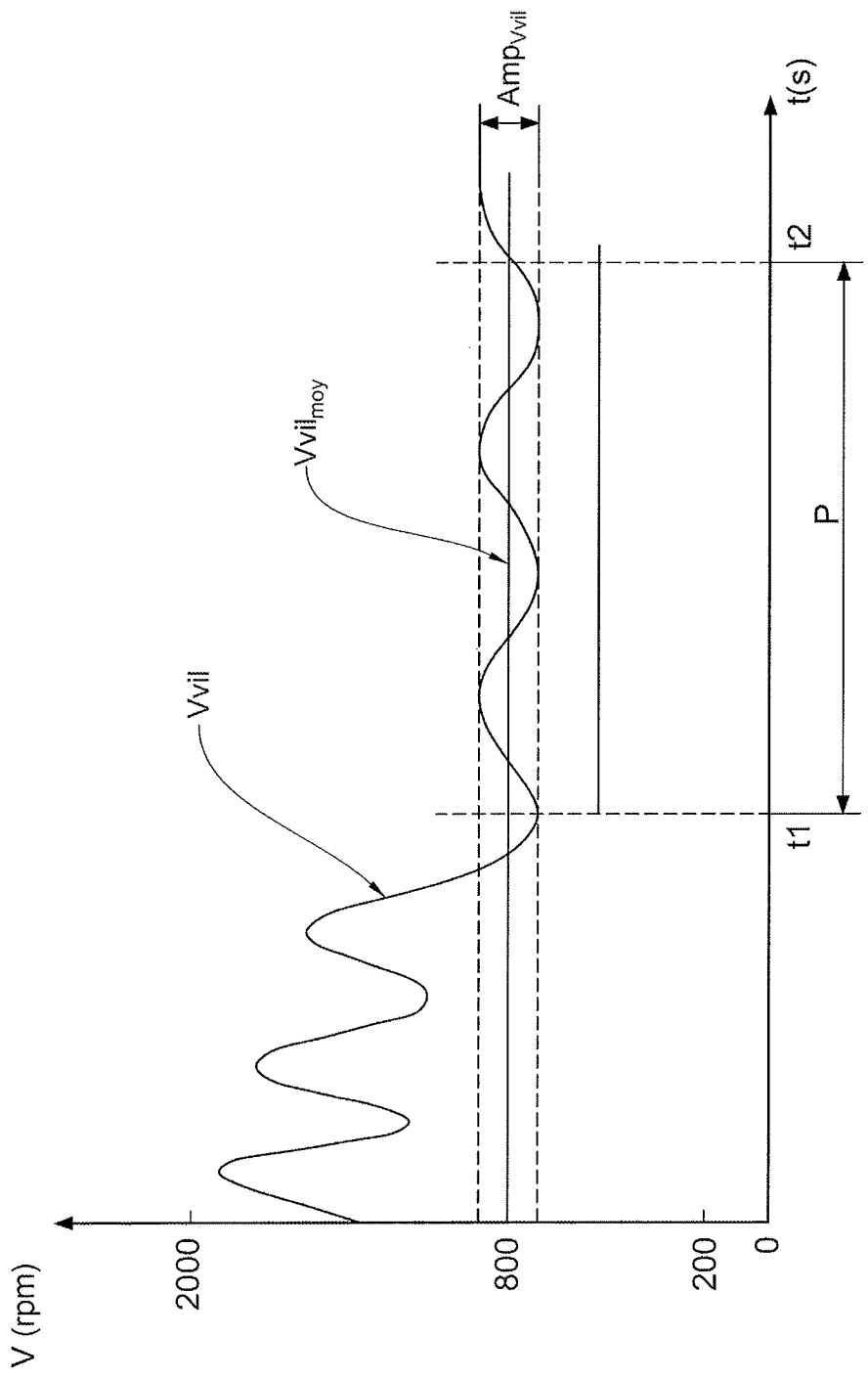
FIG. 4 is a diagram of one example of a curve of the rotational speed of the crankshaft during return of the engine to low-idle speed.

FIG. 4, which shows an example of how the rotational speed of the crankshaft evolves during a return to engine low-idle speed, must not lead to a diagnosis that the DMF has entered into resonance, according to the method described in FIG. 2, as explained hereinafter.

The abscissa and ordinate axes in this FIG. 4 are identical to those of FIG. 1 and the same references as those used in FIG. 1 indicate similar means.

In the period P=[t1, t2] comprised between the instants t1 and t2 as indicated, the engine control unit logs stability in the mean rotational speed $Vvil_{moy}$ of the crankshaft about a speed of 800 rpm which represents the low-idle speed of the engine, this stability being accompanied by fluctuations in engine speed which are of low amplitude $Amp_{Vvil}$. Despite the stability of the mean speed $Vvil_{moy}$, the engine control unit therefore logs, in that same period P, a maximum amplitude $Amp_{Vvil}$ that is below the critical resonance threshold $S_{AmpVvilrés}$. As a result, step 30 according to the flow diagram of FIG. 2 is not satisfied, and the method in this case passes on to step 40.

In the example of FIG. 4, step 40 is satisfied because, over the period P considered, the maximum amplitude $Amp_{Vvil}$ is below the threshold $S_{AmpVvilrés}$. The method thus in this case passes on to step 60, which consists in increasing the engine torque within the limit of the torque demanded by the driver.

In FIG. 4, before the instant t1 of entering the period P, the engine control unit logs a steep decrease in the mean crankshaft speed accompanied by high-amplitude fluctuations in crankshaft rotation, as shown, and does not detect entry into resonance because the mean speed is not stable or near-stable as explained in connection with the example of FIG. 3.

Figure 5:
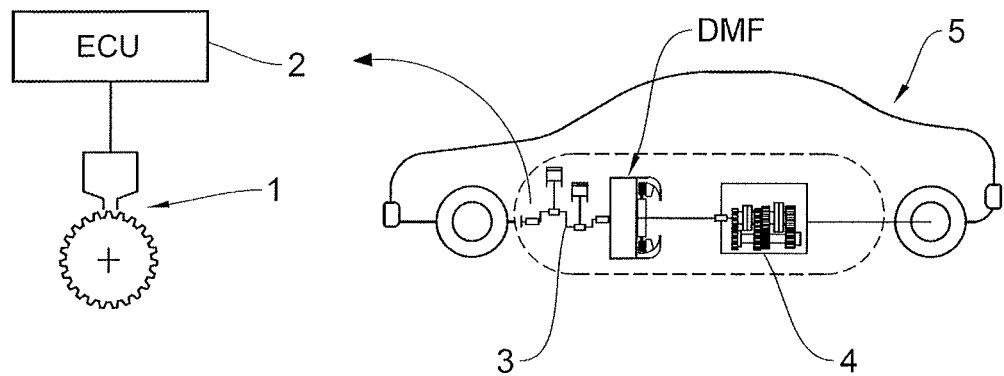
FIG. 5 is a basic diagram of one exemplary embodiment of a device according to an aspect of the invention.

FIG. 5 depicts an example of a layout of a device for protecting a dual mass flywheel by detecting, when the engine is running, that the dual mass flywheel is entering into resonance, this flywheel being positioned between an internal combustion engine 3 and a gearbox 4 of a vehicle 5, comprising:

means 1, 2 for determining the mean rotational speed of the crankshaft, over the course of time, over a predetermined given period, as being a second parameter involved in a risk of the dual mass flywheel wheel entering into resonance, taken from a crankshaft position sensor 1, and an engine control unit 2 processing the signal from the position sensor 1, as explained above in the known way, means 1, 2 for measuring the maximum instantaneous rotational speed and the minimum instantaneous rotational speed of the crankshaft, using the difference to define the maximum amplitude of the fluctuations in the rotation of the crankshaft, over the predetermined given period, as being a first parameter involved in a risk of the dual mass flywheel DMF entering into resonance, means 1, 2 for detecting that the dual mass flywheel has entered into resonance from a determined combination of values of said first and second parameters, over said predetermined given period, means 2 for limiting or cutting off an injection of fuel into the cylinders after having detected that the dual mass flywheel has entered into resonance.

As indicated in FIG. 5, the means for determining the mean rotational speed of the crankshaft, the means for measuring the maximum instantaneous rotational speed and the minimum instantaneous rotational speed of the crankshaft, using the difference to define the maximum amplitude of the fluctuations in the rotation of the crankshaft, and the means for detecting that the dual mass flywheel DMF has entered into resonance from a determined combination of values of said first and second parameters, over the predetermined given period P, the means for limiting or cutting off an injection of fuel into the cylinders after having detected that the dual mass flywheel has entered into resonance, comprise a crankshaft position detector 1 made up of a plurality of teeth making it possible to determine the rotational speed tooth by tooth, and an engine control unit 2 of known type, for example not conventionally fitted to an internal combustion engine, and implemented using software according to a method for example as described hereinabove with the aid of FIG. 2.

The invention claimed is:

1. A method for protecting a dual mass flywheel by detecting, when the engine is running, that the dual mass flywheel is entering into resonance, this flywheel being positioned between an internal combustion engine and a gearbox of a vehicle, the method comprising:

determining a mean rotational speed of the crankshaft, over the course of time over a predetermined given period, as being a first parameter involved in a risk of the dual mass flywheel entering into resonance, measuring a maximum instantaneous rotational speed and a minimum instantaneous rotational speed of the crankshaft, using the difference to define the maximum amplitude of fluctuations in the rotation of the crankshaft, over said predetermined given period, as being a second parameter involved in a risk of the dual mass flywheel entering into resonance, detecting that the dual mass flywheel has entered into resonance from a determined combination of values of said first and second parameters, over said predetermined given period, wherein the dual mass flywheel is detected to have entered into resonance when the combination of values of said first and second parameters are as follows:

said mean rotational speed of the crankshaft is between a predetermined maximum increase value and a predetermined maximum decrease value on each side of a stable mean speed value, said stable mean speed value is below or equal to a first predetermined threshold; and said maximum amplitude of the fluctuations in the rotation of the crankshaft is higher than or equal to a second predetermined threshold; and limiting or cutting off an injection of fuel into cylinders of the engine after having detected that the dual mass flywheel has entered into resonance.

2. The method as claimed in claim 1, wherein said predetermined given period is between 0.5 s and 2 s.

3. The method as claimed in claim 1, wherein said predetermined given period is between 1 s and 2 s.

4. A device for protecting a dual mass flywheel by detecting, when the engine is running, that the dual mass flywheel is entering into resonance, this flywheel being positioned between an internal combustion engine and a gearbox of a vehicle, comprising:

means for determining a mean rotational speed of the crankshaft, over the course of time over a predetermined given period, as being a first parameter involved in a risk of the dual mass flywheel entering into resonance, means for measuring a maximum instantaneous rotational speed and a minimum instantaneous rotational speed of the crankshaft, using the difference to define the maximum amplitude of fluctuations in the rotation of the crankshaft, over said predetermined given period, as being a second parameter involved in a risk of the dual mass flywheel entering into resonance, means for detecting that the dual mass flywheel has entered into resonance from a determined combination of values of said first and second parameters, over said predetermined given period, wherein the means for detecting detects that the dual mass flywheel has entered into resonance when the combination of values of said first and second parameters are as follows:

said mean rotational speed of the crankshaft is between a predetermined maximum increase value and a predetermined maximum decrease value on each side of a stable mean speed value, said stable mean speed value is below or equal to a first predetermined threshold; and said maximum amplitude of the fluctuations in the rotation of the crankshaft is higher than or equal to a second predetermined threshold; and means for limiting or cutting off an injection of fuel into cylinders of the engine after having detected that the dual mass flywheel has entered into resonance.

5. The device as claimed in claim 4, wherein said means for determining the mean rotational speed of the crankshaft, said means for measuring the maximum instantaneous rotational speed and the minimum instantaneous rotational speed of the crankshaft, using the difference to define the maximum amplitude of the fluctuations in the rotation of the crankshaft, and said means for detecting that the dual mass flywheel has entered into resonance from a determined combination of values of said first and second parameters, over said predetermined given period, said means for limiting or cutting off an injection of fuel into the cylinders after having detected that the dual mass flywheel has entered into resonance, comprise a crankshaft position detector made up of a plurality of teeth making it possible to determine the rotational speed of the crankshaft, tooth by tooth, and an engine control unit.

* * * * *

UNITED STATES PATENT AND TRADEMARK OFFICE
CERTIFICATE OF CORRECTION

| | |
|---|---|
| PATENT NO. | : 11,203,345 B2 |
| APPLICATION NO. | : 16/489135 |
| DATED | : December 21, 2021 |
| INVENTOR(S) | : Lefevre et al. |

It is certified that error appears in the above-identified patent and that said Letters Patent is hereby corrected as shown below:

On the Title Page

Item (57) Abstract, delete the abstract in its entirety and insert:
--A method for protecting a dual mass flywheel DMF by detecting, when the engine is running, that the DMF is entering into resonance, this flywheel being positioned between an internal combustion engine and a gearbox of a vehicle, including: determining the mean rotational speed of the crankshaft, over a predetermined given period, as being a first parameter involved in a risk of the DMF entering into resonance, measuring the maximum instantaneous rotational speed and the minimum instantaneous rotational speed of the crankshaft, using the difference to define the maximum fluctuation amplitude of the crankshaft rotation, over the period, as being a second parameter involved in a risk of the DMF entering into resonance, detecting that the DMF has entered into resonance from a determined combination of values of the first and second parameters, over the period, limiting or cutting off the injection of fuel into the cylinders after the detection.--

Signed and Sealed this
Seventeenth Day of May, 2022

Katherine Kelly Vidal
*Director of the United States Patent and Trademark Office*